May 30, 1972   K. O. LOVELL   3,666,489
METHOD OF PREPARING A POULTRY PRODUCT
Filed June 26, 1969

INVENTOR
KENNETH O. LOVELL
BY
Lawrence J. Hurst
ATTORNEY

United States Patent Office 3,666,489
Patented May 30, 1972

3,666,489
METHOD OF PREPARING A POULTRY PRODUCT
Kenneth O. Lovell, St. Louis, Mo., assignor to Ralston Purina Company, St. Louis, Mo.
Filed June 26, 1969, Ser. No. 836,806
Int. Cl. A22c 21/00
U.S. Cl. 99—107        2 Claims

ABSTRACT OF THE DISCLOSURE

A poultry product is formed by slicing the breast portion into relatively thin slices which are preshaped and cut into a desired configuration. A stuffing material is placed on the poultry slice and thereafter the slice is rolled to confine the stuffing material within the slice. The free end of the poultry slice may then be secured to the roll by use of a binder or the roll may be frozen so as to retain the stuffing material within said roll.

BACKGROUND OF THE INVENTION

In recent years there has been an increasing demand for new and novel products which utilize poultry parts. Such products available on the market have consisted of fabricated poultry rolls and slices, or of whole-boned poultry parts having a stuffing material supplied thereto. Heretofore, by stuffing particular poultry parts, the size of the product produced was controlled by the size of the poultry part received. The producer has had difficulty controlling or regulating with any certainty the particular size and weight of the stuffed poultry part being manufactured. By utilizing prefabricated slices, i.e., poultry pieces bound together by a matrix, the size could be controlled, but an artificial appearing product resulted. While these products have received some acceptance, it is still desirable to produce a non-fabricated poultry product having stuffing therein which is capable of being produced in desirable sized servings. According to the present invention, applicant is able to produce a stuffed poultry product which conforms to the poultry serving desired and applicant is able to maintain and control the size of the product.

It is, therefore, an object of the present invention to provide a novel poultry product which may be easily prepared for consumption.

It is another object of the present invention to provide a novel poultry product of a continuous piece of natural, non-fabricated meat having a stuffing material therein which does not require a cord for maintaining the poultry product in the shape of a roll.

Another object of the present invention is to provide a poultry roll product from a continuous slice of meat having a stuffing material therein which does not utilize a binder matrix to maintain the product in its roll shape.

These and other objects and advantages of the present invention will become more apparent thereinafter.

SUMMARY OF THE INVENTION

Briefly, the present invention comprises a poultry product and the method of preparing same by placing a stuffing material on a slice of breast meat, rolling the slice to form a poultry roll product having a stuffing material therein and freezing the product.

BRIEF DESCRIPTION OF THE DRAWINGS

In the accompanying drawings, in which one of various possible embodiments of the invention is illustrated and wherein like numerals designate like parts.

DESCRIPTION OF THE PREFERRED EMBODIMENTS

Figure 1:
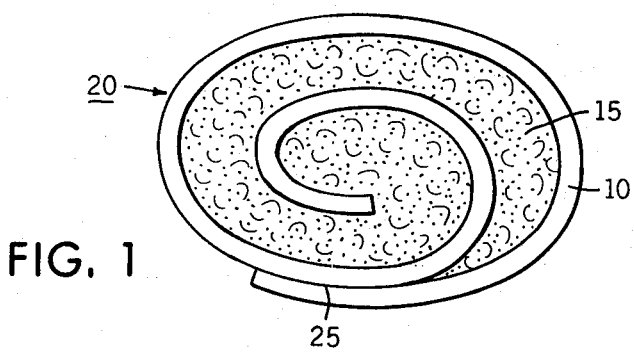
FIG. 1 is an end view of the poultry product embodying the present invention.

Poultry, which for purposes of this invention shall include duck, squab, chicken or turkey, is eviscerated and boned in the normal manner. The principal portion to be utilized in the present invention is the breast meat. When the breast is boned in the normal manner, the breast comes off as an integral piece having both the major and minor pectoral muscles connected. In preparing the subject product, it may be desirable to remove the skin from the breast before subsequent operation although this is not necessary. If the skin is so removed, it should be set aside for possible subsequent use in connection with the finished product.

The breast should then be prepared for use by removing the minor pectoral muscle, with the fat and cartilage from the breast also being trimmed. This should produce a poultry piece which is the major pectoral muscle free of all undesirable or unwanted materials. As an option, it may be desirable that the breast muscle be tenderized in the conventional manner so as to improve the overall flavor and texture of the product. This tenderization may be accomplished either by hand or by mechanical tenderizers which are commercially available, such as a Jaccard tenderizer. Throughout the aforementioned operation, it is important that the poultry portions be maintained at low temperatures, preferably below 55° F., for ease of handling and to present conditions not conducive to growth of spoilage organisms.

Thereafter, the poultry breast muscle may be treated in two manners. First, the breast may be sliced to form sheets or slices of $\frac{1}{16}''$ to $\frac{1}{2}''$ in thickness; or second, the breast may be cut in a butterfly manner to form a sheet of breast meat of various thickness and then pressed into the desired thickness. In slicing the breast to the desired thickness of $\frac{1}{16}''$ to $\frac{1}{2}''$, the breast may be crust frozen before slicing or sliced while being maintained below the temperature of 55° F. It is preferred that when making the slices that they be made parallel or with the grain of the meat so that the slices may be cut easier and that a more attractive product will be obtained. The slicing may be carried out on any conventional slicing machine which is well known in the art. In addition, it may be desirable rather than making the cuts or slices through the entire breast muscle to make a cut along and through the connective tissue which is present in the middle of the major pectoral muscle. By making such a cut along and through the cartilage, it is possible to obtain two sections which may then be cut with the grain of the meat so as to obtain slices of the desired width and thickness. Also, it should be noted that by making such a cut through the cartilage, the two breast sections formed enable slices to be obtained therefrom which substantially have the grain running longitudinally of the slices.

The poultry breast slices obtained may be utilized in forming the finished product; however, it is desirable to pre-shape or cut the slices to form pieces of a desired size for the finished product. It has been found desirable to have these slices be approximately $\frac{1}{16}''$ to $\frac{1}{2}''$ thick, approximately $3\frac{1}{2}''$ wide and weigh approximately 4 ounces; although this may be varied depending on the operator's preference. Slices, which are not the desired weight, may have additional smaller slices placed thereon to obtain the desired weight.

Referring now to FIG. 1, a breast slice 10 which has been preshaped or cut is laid flat and a viscous stuffing material 15 is placed thereon. This viscous stuffing material may consist of any type of meat, fruit, vegetable or breading material or combination thereof desired such as spinach and bacon or a seafood item such as lobster. After the stuffing material 15 has been placed on the sized breast pieces 10, the breast pieces are rolled longitudinally about the stuffing material so as to form a roll product 20 having a stuffing material therein. The roll may then be placed in a package with the seam 25 on the bottom and frozen. If desired, a binder material, such as albumen, may be added to the seam area 25 of the poultry slice so as to secure the roll meat in place. If the product is frozen, there is not a problem of an unwinding of the poultry meat so that a binder would not be necessary; however, if it is desired to prepare the poultry product for consumption when fresh, the use of a binder may be desirable. If desired to prepare the product for preparation in an oven, it may be sprayed with seasonings and oil. Thereafter the product is prepared for consumption by heating to an internal temperature of 150°–170° F. The cooked product retains its shape and does not unroll.

Figure 2:
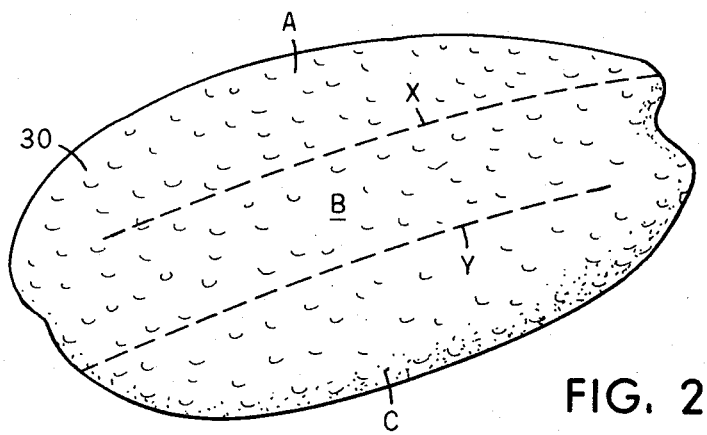
FIG. 2 is a view of a breast indicating the areas where slices should be made to obtain breast meat for producing the product of FIG. 1.
Figure 3:
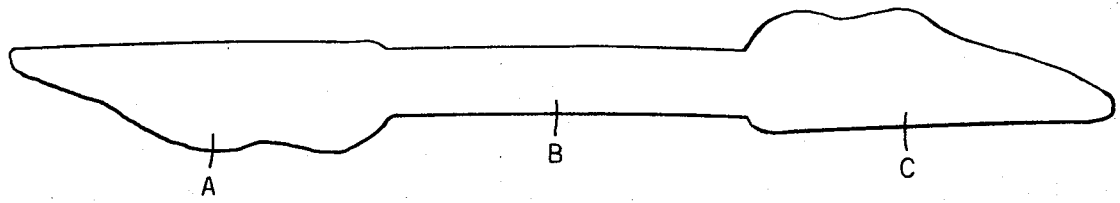
FIG. 3 is a view of the breast meat unfolded after the cuts of FIG. 2 have been made.

As an alternative to slicing the breast meat to the desired thickness, it may be desirable to make butterfly cuts in the breast and thereafter unfold the breast to form a sheet of breast meat of various thickness. Referring to FIGS. 2 and 3, the breast 30 is cut along the lines X and Y such that the breast portions A, B and C are provided. The cuts X and Y do not extend through the breast but terminate such that hinges of meat connect the breast portions A, B and C. As is obvious, the position of the cuts X and Y should be selected such that when the portions A, B and C are unfolded (as shown in FIG. 3) the breast meat may be formed into slices of the desired thickness. Preferably, this will be accomplished by attempting to make the portions A, B and C of equal thickness. The sheet of breast meat is then subjected to pressure either by passing it through rollers or to a mechanical press such that the meat assumes a uniform desired thickness. It is, of course, obvious that the pressing action should be carried out on the breast material at a temperature above the crust freeze temperature, otherwise the meat will not be able to spread and assume the desired thickness. However, the temperature of the meat should not exceed 55° F. Care should be taken in the pressing action so as to not destroy the meat and thereby cause it to crumble and fall apart. Thereafter, the pressed breast meat having the desired thickness is cut to the desired shape and weight serving, supplied with a stuffing material and rolled as previously discussed. The finished product may then be cooked by heating to an internal temperature of approximately 150 to 170° F. The product upon cooking retains its shape and the continuous meat slice does not unroll or unwind.

If desired, the poultry skin may be utilized by placing skin over the poultry roll or by surrounding the roll with skin prior to freezing. If sufficient poultry skin is not available, the poultry roll may be covered with an artificial or fabricated skin. In addition, it should be noted that if the grain of the meat runs longitudinally of the breast slice, the finished product will be presented in such a manner that slicing for consumption will be with the grain for easier slicing.

It is of course obvious, that if desired, the poultry roll could be made from large slices of breast meat and then cut to the serving size desired or the breast slices may be cut to the serving size desired and the poultry roll made therefrom. This would be entirely dependent on the operator's preference in preparing the poultry roll product.

From the foregoing, it is now apparent that a novel poultry product and a method of producing same has been described and that various modifications and changes may be made in the product and method without departing from the spirit of the invention, as defined by the claims as follows.

I claim:

1. A method of preparing a poultry product consisting of the steps of removing the breast meat from poultry, maintaining the temperature of the breast meat in the range below a temperature of about 55° F. and a temperature where the breast is crust frozen, cutting the breast meat into slices having a thickness of $\frac{1}{16}$ to $\frac{1}{2}$ inch and the skin thereof removed, forming said slices to the desired size by cutting said slices into rectangular strips having the grain of the breast meat running longitudinally of said strips, applying a viscous stuffing material on the surface of the poultry slices, rolling said poultry slices longitudinally about said stuffing material to form a poultry roll product, freezing the poultry roll product and cooking the poultry roll product in an oven, the cooking of the formed poultry roll product being to an internal temperature of about 150° F.–170° F., and said poultry roll product upon cooking retains its shape.

2. The method of preparing a poultry product according to claim 1 wherein the removed poultry skin is placed over the formed poultry roll product prior to the freezing step.

References Cited
UNITED STATES PATENTS

| | | | |
|---|---|---|---|
| 1,905,756 | 4/1933 | Schorno | 99—137 |
| 2,640,779 | 6/1953 | George | 99—107 |
| 3,036,922 | 5/1962 | Saverslak | 99—107 |

FOREIGN PATENTS

| | | | |
|---|---|---|---|
| 377,766 | 8/1932 | Great Britain | 99—107 |

OTHER REFERENCES

"The Gourmet Cook Book," 1950, published by Gourmet Distributing Corporation, 768 5th Ave., New York, p. 306, article entitled Stuffed Chicken Roll.

Tracy: "Complete Chicken Cookery," 1953, published by The Bobbs-Merrill Company, Inc., New York, p. 132, article entitled Cotellette Kiev.

HYMAN LORD, Primary Examiner